(12) United States Patent
Wilk et al.

(10) Patent No.: US 8,831,348 B2
(45) Date of Patent: Sep. 9, 2014

(54) RETROGRADE CURVE FILTERING FOR VARIABLE OFFSET CURVES

(71) Applicant: Adobe Systems Incorporated, San Jose, CA (US)

(72) Inventors: Daniel M. Wilk, Seattle, WA (US); David Paul Simons, Seattle, WA (US); Jovan Popovic, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 139 days.

(21) Appl. No.: 13/655,831

(22) Filed: Oct. 19, 2012

(65) Prior Publication Data

US 2014/0112584 A1    Apr. 24, 2014

(51) Int. Cl.
*G06T 7/00*    (2006.01)

(52) U.S. Cl.
USPC .......................................... 382/173; 382/264

(58) Field of Classification Search
None
See application file for complete search history.

(56) References Cited

U.S. PATENT DOCUMENTS 6,300,955 B1 * 10/2001 Zamir ........................... 382/283
8,391,594 B1 *  3/2013 Wang et al. ................... 382/164
2010/0312112 A1 * 12/2010 Kamiyama ................... 600/443

* cited by examiner

*Primary Examiner* — Brian P Werner
(74) *Attorney, Agent, or Firm* — Kilpatrick Townsend & Stockton LLP (57) ABSTRACT

Systems and methods are provided for providing a navigation interface to access or otherwise use image content items. In one embodiment, an image manipulation application identifies at least one offset curve corresponding to at least one base curve. The offset curve may identify an offset curve corresponding to the outer boundary of a feathered region for an image mask. The image manipulation application identifies multiple line segments identifying the offset curve. Each line segment connects a sampled point along the path of the base curve to a corresponding point along the path of the offset curve. The image manipulation application determines that the offset curve includes a retrograde region based on analyzing the line segments. The image manipulation application modifies the at least one offset curve to eliminate at least some of the retrograde region by applying a radius-modulating filter to one or more of the line segments.

20 Claims, 10 Drawing Sheets

RETROGRADE CURVE FILTERING FOR VARIABLE OFFSET CURVES

TECHNICAL FIELD

This disclosure relates generally to computer-implemented methods and systems and more particularly relates to retrograde curve filtering for variable offset curves in image content.

BACKGROUND

Image manipulation programs are used to modify or otherwise use image content. For example, an image manipulation program can generate an image mask to at least partially isolate a portion of an image such that the image portion can be positioned on top of a different background image. For example, an image mask can be used to isolate a person from a group of individuals depicted in a first image, such as a picture of a wedding, and place that person in a different image, such as a picture of a famous landmark. The mask can include an outer boundary that generally tracks the outline of the object to be isolated. The mask can identify a region of the image portion that is opaque, thereby preventing the background image from being viewed through the opaque image. The mask can also identify a feathered region of the image portion that is at least partially transparent, thereby allowing at least a portion of the background image to be viewed through feathered region. The feathered region can also specify that the amount of transparency gradually increases between the opaque region of the image portion and an edge of the mask.

Existing solutions for providing a variable amount of transparency in a feathered region generate multiple curves that are outwardly offset from an opaque portion in an image mask. These solutions interpolate an amount of transparency between the curves. These solutions can generate loops and other unexpected curve shapes, thereby causing retrograde regions in the feathered region that fail to generally follow the outline of the object to be isolated using the image mask. The presence of retrograde regions in a feathered region can decrease the aesthetic quality of the feathered region of an image mask.

SUMMARY

One embodiment involves identifying at least one offset curve corresponding to at least one base curve. The at least one base curve corresponds to an outline of at least a portion of an object depicted in an image. The embodiment also involves identifying line segments for identifying the at least one offset curve. Each line segment connects a respective sampled point along the path of the at least one base curve to a point along the path of the at least one offset curve. The embodiment also involves determining that the at least one offset curve includes a retrograde region based on analyzing the line segments. The embodiment also involves modifying the at least one offset curve to eliminate at least some of the retrograde region by applying a radius-modulating filter to one or more of the line segments.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
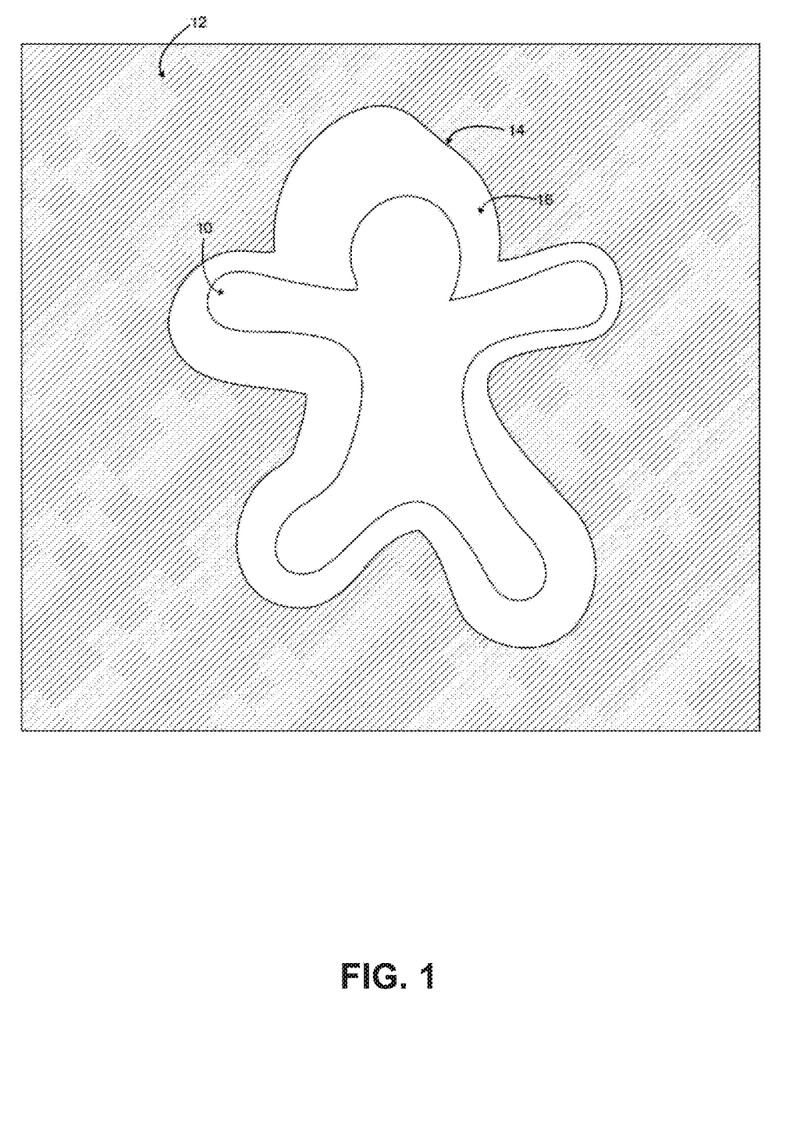
FIG. 1 is a modeling diagram illustrating image content having an image mask with a feathered region.
Figure 2:
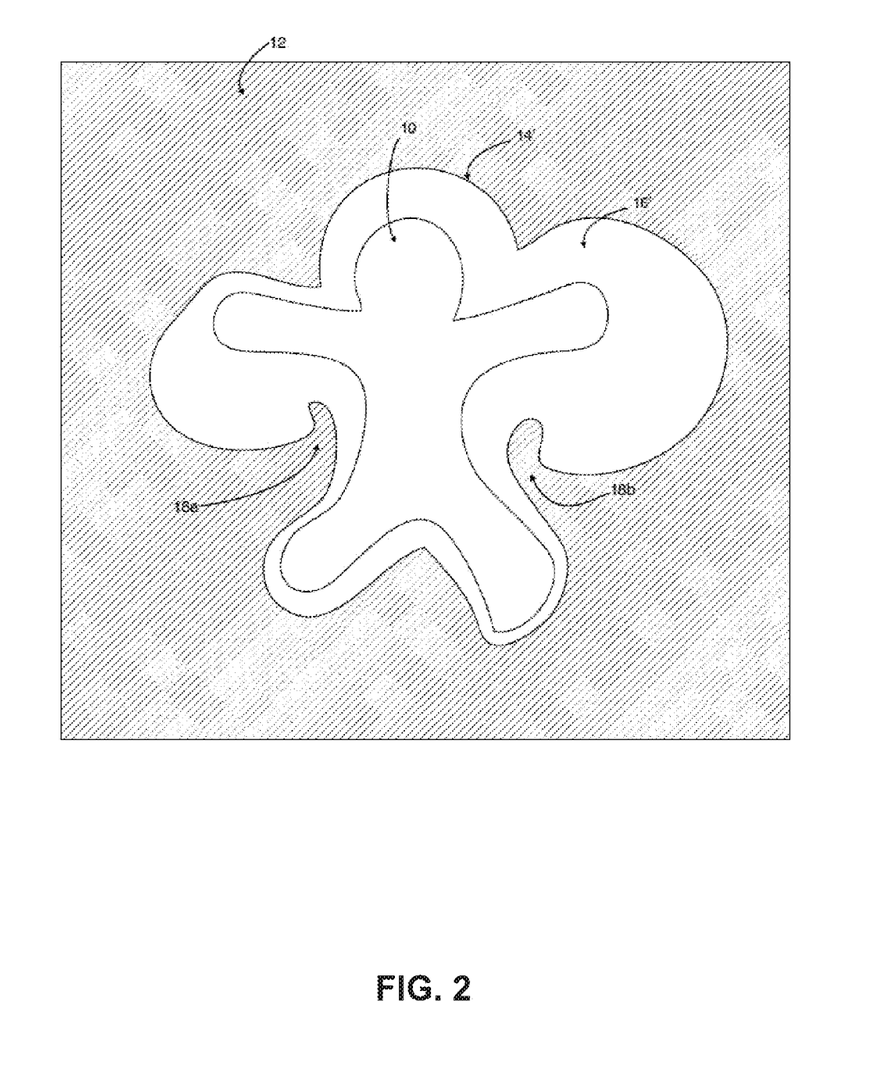
FIG. 2 is a modeling diagram illustrating image content having an image mask with a feathered region that includes retrograde regions.

Computer-implemented systems and methods are disclosed for providing improved retrograde curve filtering for variable offset curves of a mask for an image. For example, a mask may be applied to at least part of an image to be placed over a background image. The mask can include a transparent or semi-transparent region, also referred to as a feathered region. The feathered region can allow an object to be isolated from an image without a user precisely selecting the edge of the object using image manipulation software. For example, as depicted in FIG. 1, an image 10 to be positioned over the background image 12 can include a mask 14 having a feathered region 16. The background image 12 can be partially viewed through the feathered region 16. After initially generating the mask 14, a user may modify the size of the feathered region 16 to reduce the amount of extraneous image content surrounding the object to be isolated (i.e., the image 10). The amount of extraneous image content can be reduced by having the feathered region 16 follow the outline of the image 10 as closely as possible. Modifying the feathered region can generate aesthetically displeasing portions of the feathered region 16 that do not follow the outline of the image 10. For example, as depicted in FIG. 2, the concave regions 18a, 18b of the modified feathered region 16' do not generally follow the outline of the image 10 as compared to the feathered region 16 depicted in FIG. 1. An image manipulation application can apply retrograde curve filtering as the shape of the feathered region is modified to identify and eliminate aesthetically displeasing regions such as the concave regions 18a, 18b.

In accordance with one embodiment, an image manipulation application identifies at least one variable offset curve corresponding to at least one base curve. The variable offset curve can have a variable radius that is a function of a position along the base curve. The at least one base curve corresponds to an outline of at least a portion of an object depicted in an image, such as the edges of the image 10 depicted in FIG. 1. The image manipulation application may identify an offset curve corresponding to the outer boundary of a feathered region for an image mask. The image manipulation application identifies multiple line segments for identifying the offset curve. Each line segment connects a sampled point along the path of the base curve to a corresponding derived point along the path of the offset curve. The line segments can correspond to the variable radius of the offset curve with respect to the base curve. The image manipulation application determines that the offset curve includes a retrograde region based on analyzing the line segments. For example, the image manipulation application can determine that the feathered region 14 includes the concave regions 18a, 18b by analyzing the line segments corresponding to the concave regions 18a, 18b. The image manipulation application can determine that the lengths of the line segments for the concave regions 18a, 18b are changing at a faster rate than the curvature of an offset curve corresponding to the boundary of the image mask 14. The image manipulation application modifies the at least one offset curve to eliminate at least some of the retrograde region by applying a radius-modulating filter to one or more of the line segments. For example, the image manipulation application can generate linear regions from the concave regions 18a, 18b to more closely follow the outline of the image 10.

As used herein, the term "image content" is used to refer to any image that can be rendered for display or use at a computing system or other electronic device. Image content can include still images, video, or any combination thereof.

As used herein, the term "mask" is used to refer to data identifying one or more opaque regions of image content and one or more transparent regions of image content. An opaque region of image content can prevent background content from being viewed through the opaque region when the image content is positioned on top of the background content. A transparent region of image content can allow background content to be viewed, either in whole or in part, through the opaque region when the image content is positioned on top of the background content.

As used herein, the term "base curve" is used to refer to a boundary of an opaque region for a mask. In some embodiments, the base curve can be identified automatically by an image manipulation application. In other embodiments, the base curve can be identified by inputs from a user to an image manipulation application.

As used herein, the term "offset curve" is used to refer to a boundary of a feathered region for a mask. In some embodiments, the offset curve can be generated automatically by an image manipulation application. In other embodiments, the offset curve can be generated by inputs from a user to an image manipulation application. The offset curve can be variably offset such that the radius of the offset curve is a function of a position along the base curve.

As used herein, the term "feathered region" is used to refer to a portion of image content identified by a mask as being wholly, partially, or gradually transparent. A feathered region can increase in transparency in a direction from the base curve to the offset curve.

As used herein, the term "retrograde region" is used to refer to any region in which the direction of movement for the offset curve is opposite to the direction of movement for the base curve. For basic offsets, a retrograde region can appear as a loop. For variable offsets, a retrograde region can appear as a concavity or other artifact. The retrograde region can be a portion of a feathered region having a concavity that does not correspond to an outline of an image or an object in the image to which a mask is applied.

In some embodiments, analyzing the line segments can include analyzing consecutive pairs of line segments. For each consecutive pair of line segments, the image manipulation application can determine an interpolated radius for an interpolated point positioned along the base curve and between the sampled points of the line segments. The image manipulation application can identify an intersection point between the pair of line segments. The image manipulation application can determine an intersection radius that is the distance from the base curve to the intersection point. The image manipulation application can determine that the offset curve includes a retrograde region based on one or more of the consecutive pairs of line segments including a respective intersection radius that is less than a respective interpolated radius.

The image manipulation application can apply the radius-modulating filter in response to one or more of the consecutive pairs of line segments including a respective intersection radius that is less than a respective interpolated radius. In some embodiments, the image manipulation application modifies at least one of the line segments to have a length that is the minimum of the respective intersection radius and the respective interpolated radius. In other embodiments, the image manipulation application modifies at least one of the line segments to have a length that is a weighted average of the pair of line segments.

In additional or alternative embodiments, the image manipulation application can determine that the offset curve includes a retrograde region in response to the offset curve being modified or otherwise animated. For example, the offset curve can be modified based on animating or otherwise modifying the base curve. In response to determining that the offset curve includes a retrograde region, the image manipulation application can smoothly animate the offset curve such that the retrograde region is eliminated. This can occur in response to the base curve being animated or otherwise modified.

Figure 3:
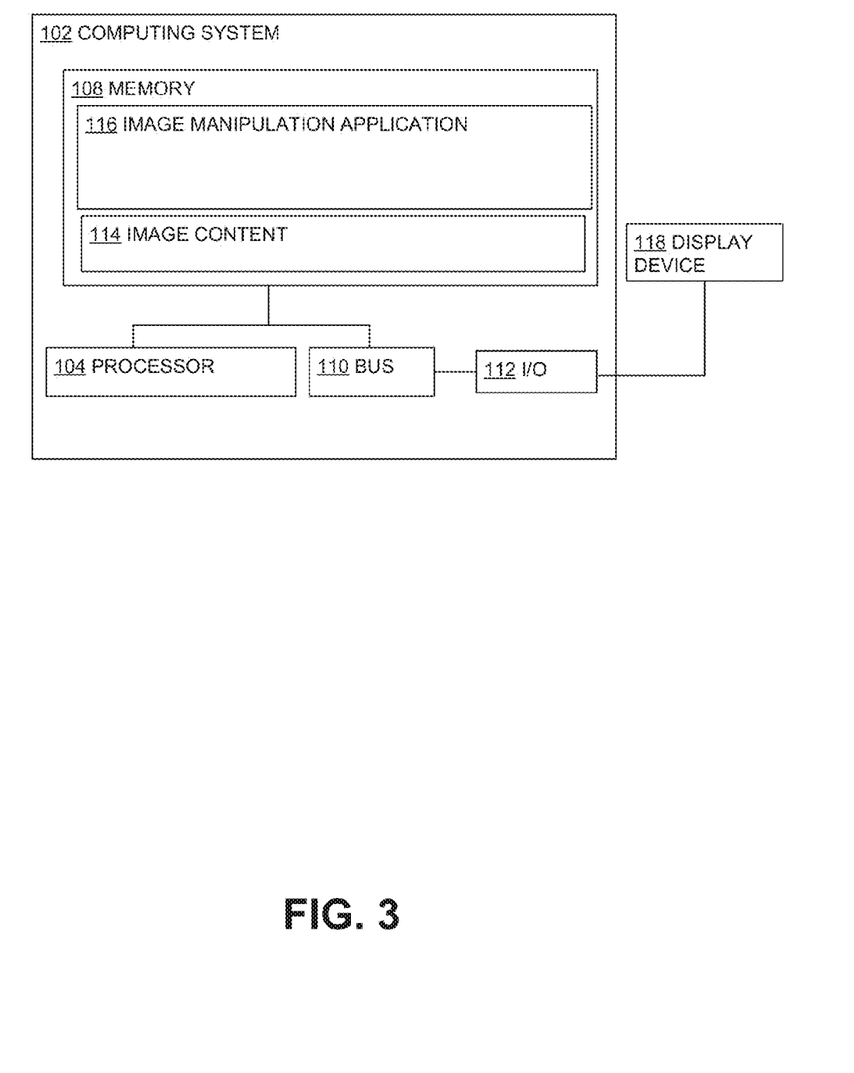
FIG. 3 is a block diagram depicting example computing systems for implementing certain embodiments.

Referring now to the drawings, FIG. 3 is a block diagram depicting an example computing system 102 for implementing certain embodiments.

The computing system 102 comprises a computer-readable medium such as a processor 104 that is communicatively coupled to a memory 108 and that executes computer-executable program instructions and/or accesses information stored in the memory 108. The processor 104 may comprise a microprocessor, an application-specific integrated circuit ("ASIC"), a state machine, or other processor. The processor 104 can include any of a number of computer processing devices, including one. Such a processor can include or may be in communication with a computer-readable medium storing instructions that, when executed by the processor 104, cause the processor to perform the steps described herein.

The computing system 102 may also comprise a number of external or internal devices such as input or output devices. For example, the computing system 102 is shown with an input/output ("I/O") interfaces 112 and display device 118. A bus 110 can also be included in the computing system 102. The bus 110 can communicatively couple one or more components of the computing system 102.

The computing system 102 can modify, access, or otherwise use image content 114. The image content 114 may be resident in any suitable computer-readable medium and execute on any suitable processor. In one embodiment, the image content 114 can reside in the memory 108 at the computing system 102. In another embodiment, the image content 114 can be accessed by the computing system 102 from a remote content provider via a data network.

An image manipulation application 116 stored in the memory 108 can configure the processor 104 to render the image content 114 for display at the display device 118. In some embodiments, the image manipulation application 116 can be a software module included in or accessible by a separate application executed by the processor 104 that is configured to modify, access, or otherwise use the image content 114. In other embodiments, the image manipulation application 116 can be a stand-alone application executed by the processor 104.

A computer-readable medium may comprise, but is not limited to, electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing system 102 can include any suitable computing device for executing the image manipulation application 116. Non-limiting examples of a computing device include a desktop computer, a tablet computer, a smart phone, or any other computing device suitable for rendering image content.

Figure 4:
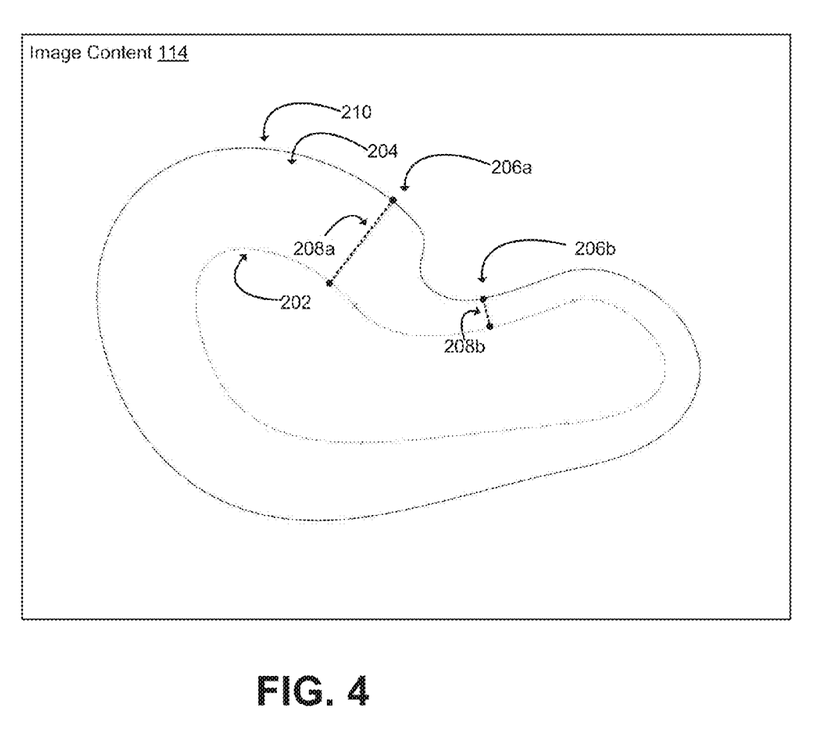
FIG. 4 is a modeling diagram illustrating a selection a region of example image content for editing by an image manipulation application.

FIG. 4 is a modeling diagram illustrating a selection a region of example image content 114 for editing by an image manipulation application 116.

The image manipulation application 116 can be can be executed by the processor 104 to draw a mask on image content 114. Drawing a mask can include selecting an opaque portion of the image content 114 delineated by a base curve 202. Drawing a mask can also include delineating a region of the image content 114 outside of the base curve 202 as a feathered region 204. In some embodiments, the image manipulation application 116 can designate that image content 114 in the feathered region 204 gradually transitions into transparency in the direction of the offset curve 210.

The feathered region 204 can be defined using one or more offset points, such as offset points 206a, 206b. The position of the offset points 206a, 206b can be modified based on input to the image manipulation application 116 to modify the shape of the feathered region 204. Each of the offset points 206a, 206b can identify respective offset radii 208a, 208b from the base curve 202. An offset curve 210 that is outwardly offset from the base curve 202 can be determined based on the placement of offset points 206a, 206b and the offset radii 208a, 208b.

The offset curve 210 can define an outer boundary of the feathered region 204. The image manipulation application can receive one or more inputs modifying one or more of the offset radii 208a, 208b.

The image manipulation application 116 can generate the offset curve 210 by generating a series of intermediate curves that are offset from the base curve 202. Each intermediate curve is generated by periodically sampling the base curve 202 at one or more sample points. Each point along the offset curve is positioned at a normal to the base curve 202 and at a distance determined based on one of the offset points 206a, 206b.

In some embodiments, the image manipulation application 116 can determine the offset curve 210 by subdividing the base curve 202 into multiple sub-curves. For each sub-curve, the base curve 202 is recursively sub-divided. The base curve 202 is subdivided based on t-values that are determined based on the placement of offset points 206a, 206b and the offset radii 208a, 208b. The image manipulation application 116 analyzes each sub-curve at a respective sample point. At each sample point, the image manipulation application 116 determines an inner radius for the sub-curve, an outer radius for the sub-curve, and a normal vector of the base curve 202. The image manipulation application 116 can determine the inner radius and the outer radius based on a cubic spline interpolation between multiple offset points, such as offset points 206a, 206b. The cubic spline interpolation can be computed along the arc length of the curve, wherein the distance traveled along the curve is used as the interpolant. The image manipulation application 116 can cease the recursive subdivision when both an inner projected offset sub-curve and an outer projected offset sub-curve are sufficiently flat. The inner projected offset sub-curve is defined based on the inner radius and the normal vector for the base curve 202 at the sampled point for the sub-curve. The outer projected offset sub-curve is defined based on the outer radius and the normal vector for the base curve 202 at the sampled point for the sub-curve. The image manipulation application 116 determines that the inner projected offset sub-curve and an outer projected offset sub-curve are sufficiently flat with respect to one another based on a pre-determined flatness criteria. For each sample point, a t-value and a normal vector for the sub-curve is determined. The image manipulation application 116 determines the offset curve 210 based on the group of sub-curves defined by respective t-values and normal vectors at respective sample points.

The offset curve 210 changes in response to modifications to the offset radii 208a, 208b. Changes to the offset curve 210 can cause the offset curve 210 to define a feathered region 204 having one or more retrograde regions. For example, FIG. 5 is a modeling diagram illustration a feathered region 204 of image content 114 that includes a retrograde region 301 caused by modifying the offset curve 210.

Figure 5:
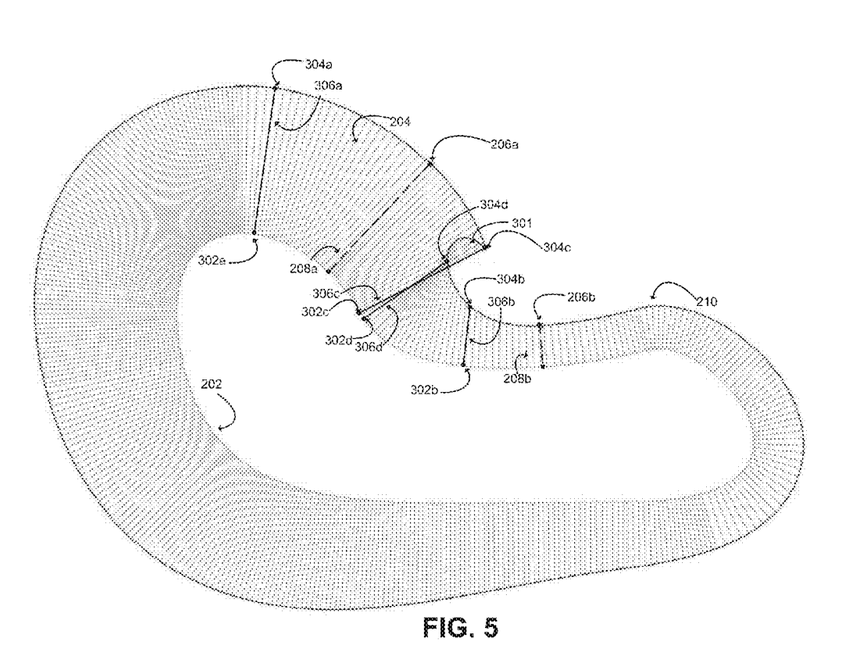
FIG. 5 is a modeling diagram illustration a feathered region of image content that includes a retrograde region caused by modifying an offset curve of the feathered region.

As depicted in FIG. 5, the position of offset point 206a and the variable offset radius 208a can be selected to enlarge the feathered region 204 on the left side of the image content 114. The position of offset point 206b and the offset radius 208b can be selected to reduce the size of the feathered region 204 on the right side of the image content 114.

The offset curve 210 can be represented as a path defined by a series of points, such as the derived offset points 304a-d depicted in FIG. 5. The derived offset points 304a-d are normal to the respective sampling points 302a-d along the path of the base curve 202. The derived offset points 304a-d are positioned at the respective interpolated offset radii 306a-d from the base curve 202. Each of the interpolated offset radii 306a-d is determined based on one or more of the offset radii 208a, 208b.

The retrograde region 301 can be defined by one or more derived offset points, such as the derived offset points 304c, 304d. The derived offset point 304c is oriented normal to the corresponding sampling point 302c at an interpolated offset radius 306c. The derived point 304d is oriented normal to the corresponding sampling point 302d at an interpolated offset radius 306d. The positions of sampling points 302c, 302d and the interpolated offset radii 306c, 306d can cause the derived point 304d to be positioned to the left of the derived offset point 304c despite the sampling point 302c being positioned to the left of the sampling point 302d in the base curve 202.

Thus, the offset curve 210 including both derived offset points 304c, 304d includes a retrograde region 301.

Figure 6:
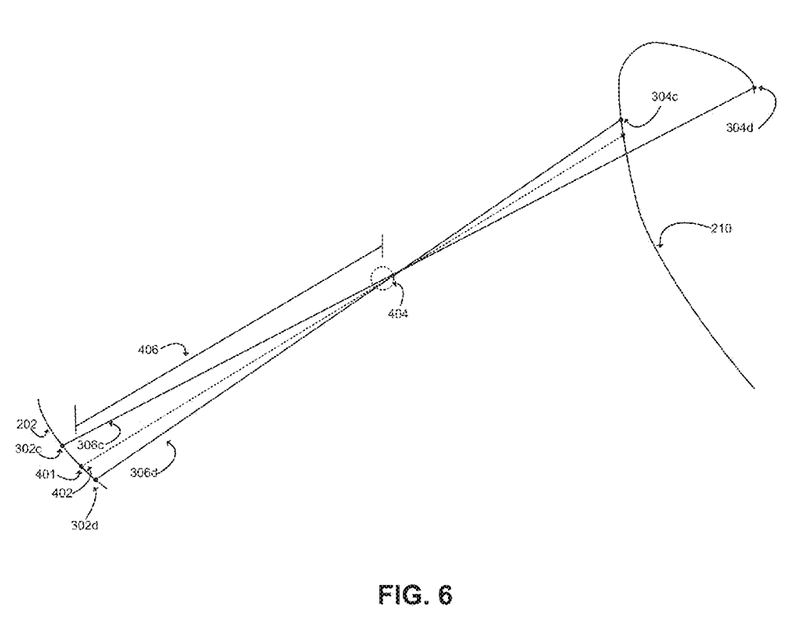
FIG. 6 is a modeling diagram illustrating detection of a retrograde region using an interpolated radius.

FIG. 6 is a modeling diagram illustrating detection of a retrograde region 301 using an interpolated radius 402. FIG. 6 depicts a magnified region of FIG. 5 that includes an intersection point 404 between the interpolated offset radii 306c, 306d at an intersection radius 406. The image manipulation application 116 can generate one or more interpolated radii, such as interpolated radius 402. The image manipulation application 116 can determine that a retrograde region 301 is present based on the intersection radius 406 being less than the interpolated radius 402.

For example, the image manipulation application 116 can evaluate each of the sampled points 302c, 302d to determine respective t-values for sub-curves of the offset curve 210 associated with each of the sampled points 302c, 302d. A respective t-value for each of the sampled points 302c, 302d can determine the respective interpolated offset radii 306c, 306d. The image manipulation application 116 can identify an interpolated point 401 between the sampled points 302c, 302d. The image manipulation application 116 can determine an interpolated radius 402 normal to the interpolated point 401. The image manipulation application 116 can determine that a retrograde region exists based on the intersection radius 406 being less than the interpolated radius 402.

Figure 7:
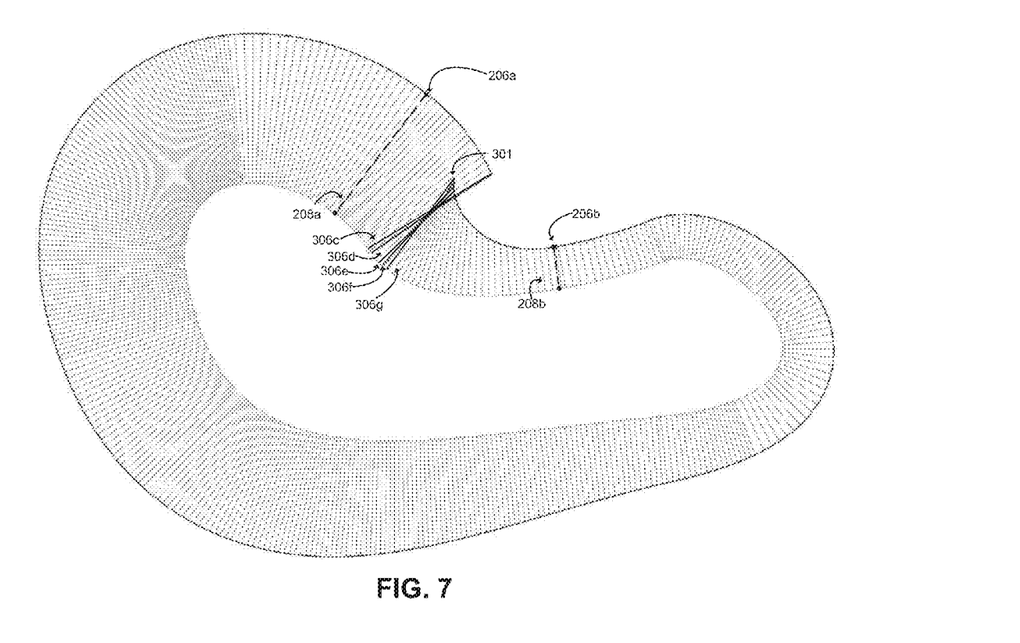
FIG. 7 is a modeling diagram illustrating a region of example image content having a feathered region with a retrograde region.

The image manipulation application 116 can thus identify one or more points along the offset curve 210 associated with a retrograde region of the offset curve 210. For example, FIG. 7 is a modeling diagram illustrating a region of example image content 114 having a feathered region 204 with the retrograde region 301. The retrograde region 301 includes the points defined by the interpolated offset radii 306c-g.

The image manipulation application 116 can apply a radius-modulating filter that modulates each of the interpolated offset radii 306c-g. Modulating the interpolated offset radii 306c-g can prevent a respective intersection point between each consecutive pair of the interpolated offset radii 306c-g radii from having an intersection radius that is less than an interpolated radius for the consecutive pair of interpolated offset radii. In one example, a radius-modulating filter can modify each of the interpolated offset radii 306c-g to have a length equal to the weighted average of the two neighboring radii. In another example, for each consecutive pair of interpolated offset radii 306c-g, a radius-modulating filter can modify the length of one of interpolated offset radii to be the minimum of either an interpolated radius between the pair of interpolated offset radii or an intersection radius for the pair of interpolated offset radii.

Figure 8:
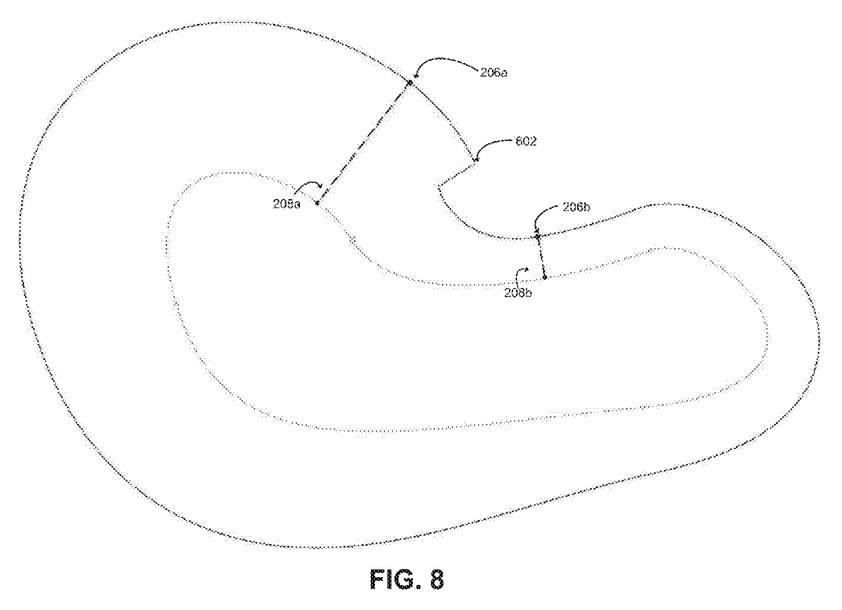
FIG. 8 is a modeling diagram illustrating a retrograde region after application of a radius-modulating filter.
Figure 9:
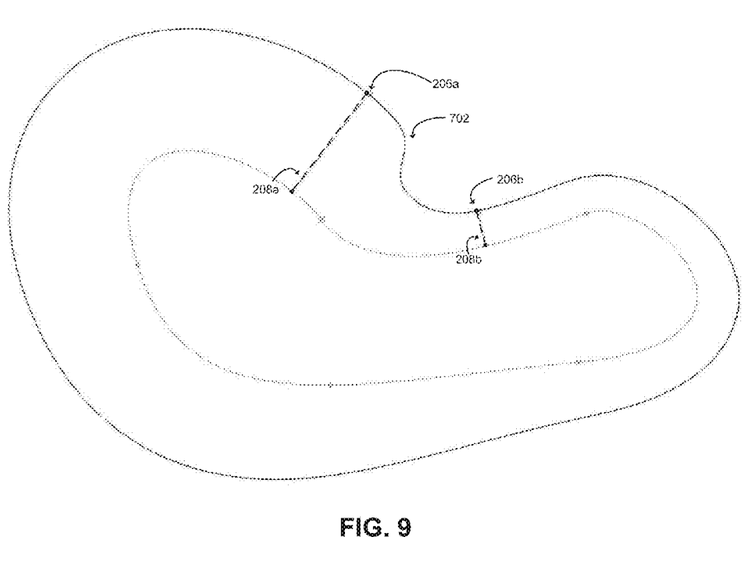
FIG. 9 is a modeling diagram illustrating a linear region generated from a retrograde region after application of a spatial filter.

The radius-modulating filter applied by the image manipulation application 116 can thereby modify the retrograde region 301 to generate the linear region 602 depicted in FIG. 8. In additional or alternative embodiments, the image manipulation application 116 can apply an additional filter, such as a local spatial filter, to modify the linear region 602 to generate a curved region 702, as depicted in FIG. 9.

Figure 10:
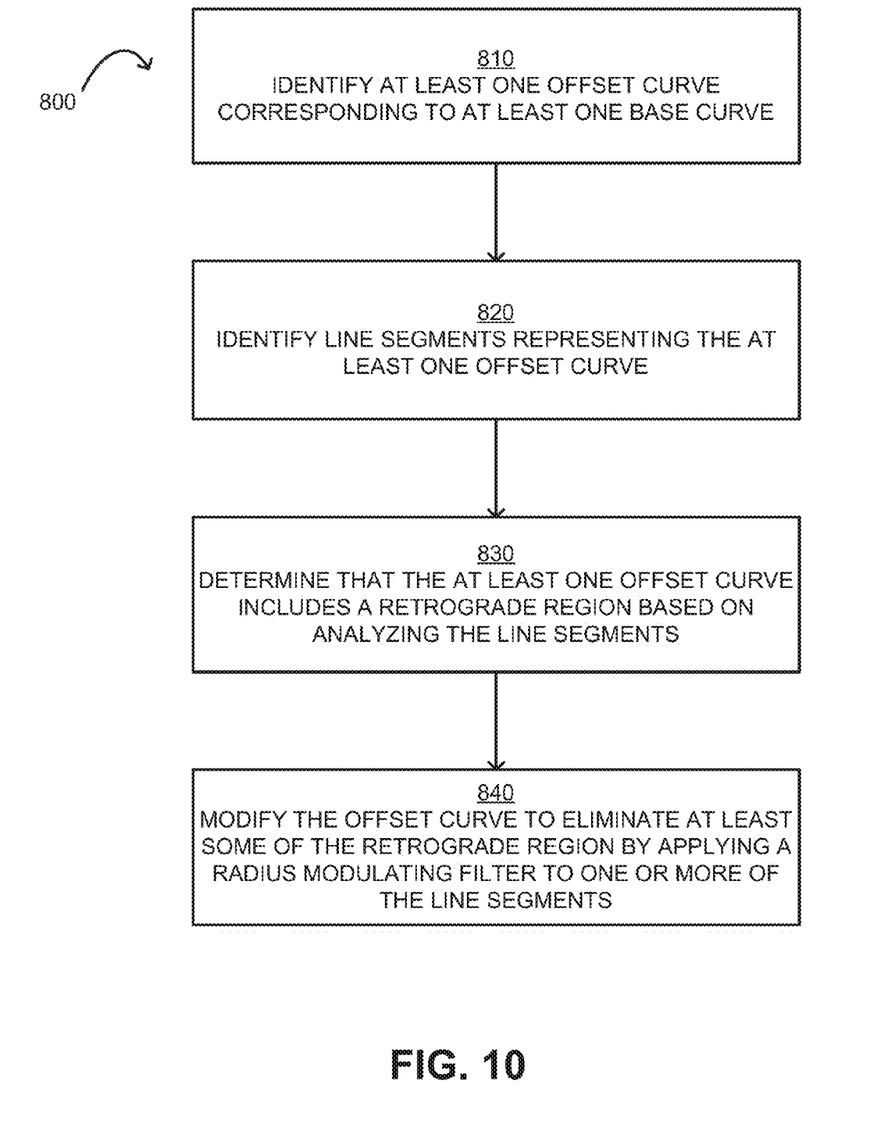
FIG. 10 is a flow chart illustrating an example method for retrograde curve filtering for variable offset curves in image content.

FIG. 10 is a flow chart illustrating an example method 800 for retrograde curve filtering for variable offset curves in image content. For illustrative purposes, the method 800 is described with reference to the system implementation depicted in FIG. 3 and the operations depicted in FIGS. 4-9. Other implementations, however, are possible.

The method 800 involves identifying at least one offset curve 210 corresponding to at least one base curve 202, as shown in block 810. The processor 104 of the computing system 102 can execute the image manipulation application 116 to identify the offset curve 210. The base curve 202 can correspond to an outline of at least a portion of an object depicted in image content 114. The image manipulation application 116 can identify the offset curve 210 as described above with respect to FIG. 4.

The method 800 further involves identifying line segments identifying the offset curve 210, as shown in block 820. The processor 104 can execute the image manipulation application 116 to identify the line segments. Each line segment connects a sampled point along the path of base curve 202, such as one of the sampled points 302a-d, to a derived point along the path of the offset curve, such as a respective one of the derived offset points 304a-d. Each line segment can have a length of the interpolated offset radii 306a-d.

The method 800 further involves determining that the offset curve 210 includes a retrograde region 301 based on analyzing the line segments, as shown in block 830. The processor 104 can execute the image manipulation application 116 to determine that that the offset curve 210 includes a retrograde region 301.

In some embodiments, the image manipulation application 116 can analyze the line segments in pairs. For each pair of line segments, such as the interpolated offset radii 306c, 306d, the image manipulation application 116 determines an interpolated line segment corresponding to an interpolated radius from the base curve 202, such as the interpolated radius 402. The image manipulation application 116 identifies a respective intersection point at an intersection radius from the base curve 202, such as the intersection point 404 at the intersection radius 406. The image manipulation application 116 can determine that the offset curve 201 includes a retrograde region 301 by determining that one or more of the intersection points, such as the intersection point 404, occurs at an intersection distance, such as intersection radius 406, that is less than a respective interpolated distance, such as the interpolated radius 402.

The method 800 further involves modifying the offset curve 210 to eliminate at least some of the retrograde region 301 by applying a radius-modulating filter to one or more of the line segments, as shown in block 840. The processor 104 can execute the image manipulation application 116 to eliminate or otherwise reduce at least some of the retrograde region 301. For example, the image manipulation application 116 can generate a linear region 602 from the retrograde region 301.

In some embodiments, the image manipulation application 116 can reduce the retrograde region 301 by replacing an interpolated radius 402 with the minimum of the intersection radius 406 and the interpolated radius 402. Replacing an interpolated radius with the minimum of the intersection radius and the interpolated radius can reduce or eliminate retrograde line segments, thereby generating a linear region 602.

In additional or alternative embodiments, the image manipulation application 116 can perform planar map operation to remove negative areas and loops from the retrograde region 301 as modified by the radius-modulating filter.

In additional or alternative embodiments, the image manipulation application 116 can perform local spatial filtering of the offset curve 210 in the linear region 602. A non-limiting example of local spatial filtering is a Gaussian convolution of the offset curve 210 in the linear region 602. The image manipulation application 116 can generate also paths that are interpolated between a variably offset inner curve and variably offset outer curve. The paths can be used for rasterization of the portion of the image content 114 delineated by the base curve 202 and the offset curve 210. Performing local spatial filtering of the offset curve 210 in the linear region 602 can generate a curved region 702.

In additional or alternative embodiments, the method 800 can be performed in response to the offset curve 210 being modified. For example, the image manipulation application 116 can receive one or more inputs modifying the base curve 202. The one or more inputs can be received prior to executing blocks 810-840. The image manipulation application 116 can modify the shape of the offset curve in response to the base curve 202 being modified. The modifications to the base curve 202 and the offset curve 210 can be rendered for display as a series of intermediate modifications, thereby "animating" the modifications to the base curve 202 and the offset curve 210. The retrograde region 301 of the offset curve 210 can be generated prior to rendering the offset curve 210 as modified. The offset curve 210 can be rendered for display with the linear region 602 without rendering the offset curve 210 with the retrograde region 301. Performing the method 800 in response to the offset curve 210 being modified can thus reduce or eliminate a retrograde region 301 prior to rendering the modification to the offset curve 210.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   identifying, by an image manipulation application executed by a processing device, at least one offset curve corresponding to at least one base curve;
   identifying, by the image manipulation application, a plurality of line segments for identifying the at least one offset curve, wherein each line segment connects a respective sampled point along the path of the at least one base curve to a point along the path of the at least one offset curve;
   determining, by the image manipulation application, that the at least one offset curve includes a retrograde region based on analyzing the plurality of line segments;
   modifying, by the image manipulation application, the at least one offset curve to eliminate at least some of the retrograde region by applying a radius-modulating filter to one or more of the plurality of line segments.

2. The method of claim 1, wherein analyzing the plurality of line segments comprises:
   for each consecutive pair of line segments:
      determining an interpolated point between the respective sampled points for the respective line segments,
      determining an interpolated radius for the interpolated point, and
      identifying an intersection point at an intersection radius between the pair of line segments; and
   determining that one or more of the consecutive pairs of line segments includes a respective intersection radius that is less than a respective interpolated radius.

3. The method of claim 2, wherein applying the radius-modulating filter to one or more of the plurality of line segments comprises, for each of the one or more of the consecutive pairs of line segments that includes the respective intersection radius that is less than the respective interpolated radius, modifying at least one of the line segments to have a length that is the minimum of the respective intersection radius and the respective interpolated radius.

4. The method of claim 3, wherein applying the radius-modulating filter to one or more of the plurality of line segments comprises, for each of the one or more of the consecutive pairs of line segments that includes the respective intersection radius that is less than the respective interpolated radius, modifying at least one of the line segments to have a length that is a weighted average of the pair of line segments.

5. The method of claim 1, wherein the at least one base curve corresponds to an outline of at least a portion of an object depicted in an image.

6. The method of claim 5, wherein identifying the at least one offset curve comprises:
   dividing the at least one base curve into a plurality of sub-curve, wherein each sub-curve corresponds to a respective sampled point of the at least one base curve and a plurality of offset points, wherein each offset point is positioned at a respective offset radius from the at least one base curve; and for each sub-curve:
recursively subdividing the at least one base curve based on the plurality of offset points,
determining an inner radius for the sub-curve, an outer radius for the sub-curve, and a normal vector of the at least one base curve, wherein the inner radius and the outer radius are determined based on a cubic spline interpolation between one or more of the plurality of offset points,
ceasing subdivision of the at least one base curve in response to an inner projected offset sub-curve and an outer projected offset sub-curve satisfying a pre-determined flatness criteria, wherein the inner projected offset sub-curve is defined by the inner radius and the normal vector for the at least one base curve at the sampled point for the sub-curve, wherein the outer projected offset sub-curve is defined by the outer radius and the normal vector for the at least one base curve at the sampled point for the sub-curve, and
determining a sub-curve t-value and a normal vector for the sub-curve;
determining the at least one offset curve based on the group of sub-curves defined by respective sub-curve t-values and normal vectors at respective sample points.

7. The method of claim 6, wherein the plurality of offset points defines a feathered region of the object, wherein the feathered region transitions into transparency in the direction of the at least one offset curve.

8. The method of claim 1, wherein modifying the at least one offset curve to eliminate at least some of the retrograde region comprises generating a linear region from the retrograde region.

9. The method of claim 8, wherein generating the linear region further comprises performing a planar map operation removing at least one of a negative area or a loop from the retrograde region as modified by the radius-modulating filter.

10. The method of claim 8, further comprising generating a curved region from the linear region by applying a spatial filter to the linear region.

11. The method of claim 1, further comprising:
prior to identifying the at least one offset curve, receiving, by the image manipulation application, a modification to the at least one base curve, wherein the at least one offset curve is modified in response to the at least one base curve being modified; and
subsequent to generating the linear region from the retrograde region, rendering the at least one offset curve with the linear region for display.

12. A non-transitory computer-readable medium embodying program code executable by a processing device, the non-transitory computer-readable medium comprising:
program code for identifying at least one offset curve corresponding to at least one base curve;
program code for identifying a plurality of line segments for identifying the at least one offset curve, wherein each line segment connects a respective sampled point along the path of the at least one base curve to a point along the path of the at least one offset curve;
program code for determining that the at least one offset curve includes a retrograde region based on analyzing the plurality of line segments;
program code for modifying the at least one offset curve to eliminate at least some of the retrograde region by applying a radius-modulating filter to one or more of the plurality of line segments.

13. The non-transitory computer-readable medium of claim 12, wherein the program code for analyzing the plurality of line segments comprises program code for:
for each consecutive pair of line segments:
determining an interpolated point between the respective sampled points for the respective line segments,
determining an interpolated radius for the interpolated point, and
identifying an intersection point at an intersection radius between the pair of line segments; and
determining that one or more of the consecutive pairs of line segments includes a respective intersection radius that is less than a respective interpolated radius.

14. The non-transitory computer-readable medium of claim 13, wherein applying the radius-modulating filter to one or more of the plurality of line segments comprises, for each of the one or more of the consecutive pairs of line segments that includes the respective intersection radius that is less than the respective interpolated radius, modifying at least one of the line segments to have a length that is the minimum of the respective intersection radius and the respective interpolated radius.

15. The non-transitory computer-readable medium of claim 12, wherein the at least one base curve identifies a boundary of an opaque region for an image mask of the image and the at least one offset curve identifies a boundary of a feathered region for the image mask, wherein the feathered region transitions into transparency in the direction of the at least one offset curve.

16. The non-transitory computer-readable medium of claim 12, wherein modifying the at least one offset curve to eliminate at least some of the retrograde region comprises generating a linear region from the retrograde region.

17. The non-transitory computer-readable medium of claim 16, further comprising program code for generating a curved region from the linear region by applying a spatial filter to the linear region.

18. The non-transitory computer-readable medium of claim 12, further comprising:
program code for, prior to identifying the at least one offset curve, receiving a modification to the at least one base curve, wherein the at least one offset curve is modified in response to the at least one base curve being modified; and
program code for, subsequent to generating the linear region from the retrograde region, rendering the at least one offset curve with the linear region for display.

19. A system comprising:
a processor configured to execute instructions stored in a non-transitory computer-readable medium;
wherein the instructions comprise an image manipulation application configured to perform operations comprising:
identifying at least one offset curve corresponding to at least one base curve;
identifying a plurality of line segments for identifying the at least one offset curve, wherein each line segment connects a respective sampled point along the path of the at least one base curve to a point along the path of the at least one offset curve;
determining that the at least one offset curve includes a retrograde region based on analyzing the plurality of line segments;

modifying the at least one offset curve to eliminate at least some of the retrograde region by applying a radius-modulating filter to one or more of the plurality of line segments.

20. The system of claim 19, wherein analyzing the plurality of line segments comprises:
for each consecutive pair of line segments:
determining an interpolated point between the respective sampled points for the respective line segments,
determining an interpolated radius for the interpolated point, and
identifying an intersection point at an intersection radius between the pair of line segments; and
determining that one or more of the consecutive pairs of line segments includes a respective intersection radius that is less than a respective interpolated radius.

* * * * *